May 3, 1932.  T. P. WELLS  1,856,179
FLOWERPOT
Filed Nov. 30, 1929
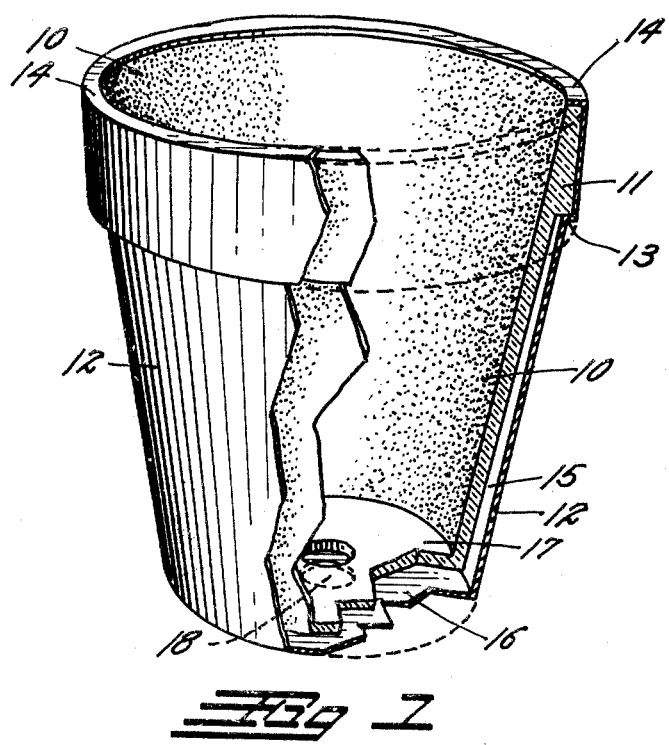
Fig. 1
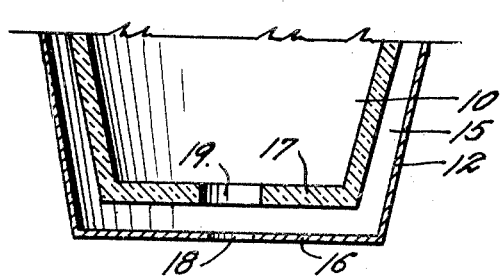
Fig. 2
Inventor
THOMAS P. WELLS
By 
Attorney Patented May 3, 1932

1,856,179

UNITED STATES PATENT OFFICE

THOMAS P. WELLS, OF DENVER, COLORADO, ASSIGNOR OF ONE-HALF TO THOMAS K. HUDSON, OF DENVER, COLORADO

FLOWERPOT

Application filed November 30, 1929. Serial No. 410,710

This invention relates to a cover for flower pots and has for its principal object the provision of a cover of this type which can be rigidly affixed to the pot and which will act to protect and ornament the pot without interfering with the natural absorptive properties and drainage of the pot.

A further object of the invention resides in the specific construction of the cover which enables it to co-act with the usual rim band of the pot to always maintain the cover firmly in place thereon and yet provide an air chamber completely surrounding the pot to allow absorption of air through the porous pot to the plant roots.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view partly broken away to show the construction of the improved pot.

Fig. 2 is a detail vertical section through the bottom of the pot.

In the drawings, an ordinary porous clay flower pot is indicated at 10, provided with the usual flange or rim band 11 and bottom 17. The improved cover comprises a relatively deep bowl 12 formed of sheet metal. The bowl 12 preferably has a lesser degree of inclination to its sides than the pot 10 and is of a greater depth than the pot so that it will extend below the bottom 17 thereof.

The bowl 12 is provided with an outwardly extending shelf 13 upon which the lower face of the rim band 11 of the pot rests. After the pot is in position within the bowl 12 the top of the bowl is spun or pressed into an inwardly extending flange 14 which will firmly clamp the rim band 11 of the pot against the shelf 13 and hold the pot in a firm concentric position therein.

It will be noted that by this construction the sheet metal bowl firmly engages the rim band 11 of the pot and yet is placed in spaced relation from the remainder of the pot so as to leave an air jacket 15 entirely about the soil containing portion thereof. This air jacket 15 also extends under the pot, since the bottom of the bowl 12, illustrated at 16, is spaced below the bottom 17 of the pot. The bottom of the bowl 16 is perforated as indicated at 18 immediately opposite the drain hole 19 of the pot 10.

By this construction the pot 10 is protected from external damage and a smooth metallic surface is provided which can be easily and suitably ornamented. The air jacket 15 serves to completely surround the pot with air so that the proper absorption is provided for the plant roots.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An ornamental cover for flower pots of the type having a rim band about their upper edges comprising: a metallic bowl surrounding said pot; a shoulder formed in said bowl in contact with the lower edge of said rim band; and an inwardly extending flange adapted to engage the upper edge of said rim band so as to maintain said pot in place, said shoulder and said flange being formed of the material of said bowl.

2. An ornamental cover for flower pots of the type provided with a rim band comprising: a metallic bowl surrounding said pot; a shoulder formed in said bowl in contact with the lower edge of said rim band; and an inwardly extending flange formed on said bowl adapted to engage the upper edge of said rim band so as to maintain said pot in place with a space between said pot and said bowl below said rim band.

3. An ornamental cover for flower pots having a rim band comprising: a metallic bowl provided with a peripheral shelf adapted to engage the bottom of said rim band; and an inwardly extending flange adapted to engage the top of said rim band and maintain said pot permanently in place, the bottom of said bowl being spaced from the bottom of said pot and there being a drainage opening in the bottom of said bowl.

In testimony whereof, I affix my signature.

THOMAS P. WELLS.